(12) United States Patent
Bookbinder et al.

(10) Patent No.: US 7,930,904 B2
(45) Date of Patent: Apr. 26, 2011

(54) METHOD OF MAKING AN OPTICAL FIBER HAVING VOIDS

(75) Inventors: Dana Craig Bookbinder, Corning, NY (US); Richard Michael Fiacco, Corning, NY (US); Ming-Jun Li, Horseheads, NY (US); Michael Thomas Murtagh, Painted Post, NY (US); Pushkar Tandon, Corning, NY (US)

(73) Assignee: Corning Incorporated, Corning, NY (US)

(*) Notice: Subject to any disclaimer, the term of this patent is extended or adjusted under 35 U.S.C. 154(b) by 461 days.

(21) Appl. No.: 12/244,359

(22) Filed: Oct. 2, 2008

(65) Prior Publication Data

US 2009/0032983 A1  Feb. 5, 2009

Related U.S. Application Data

(62) Division of application No. 11/583,098, filed on Oct. 18, 2006, now Pat. No. 7,450,806.

(60) Provisional application No. 60/734,995, filed on Nov. 8, 2005, provisional application No. 60/789,798, filed on Apr. 5, 2006, provisional application No. 60/845,927, filed on Sep. 20, 2006.

(51) Int. Cl.
*C03B 37/018* (2006.01)

(52) U.S. Cl. ............... 65/379; 65/393; 65/413; 65/424; 65/427

(58) Field of Classification Search .................... 65/379, 65/393, 413, 414, 421, 424, 427
See application file for complete search history.

(56) References Cited

U.S. PATENT DOCUMENTS

| 1,737,662 | A | * | 12/1929 | Loepsinger | 65/109 |
| 4,655,808 | A | * | 4/1987 | Kyoto et al. | 65/416 |
| 4,978,378 | A | * | 12/1990 | Ito et al. | 65/424 |
| 5,191,206 | A | | 3/1993 | Boiarski et al. | 250/227.14 |
| 5,802,236 | A | | 9/1998 | DiGiovanni et al. | 385/127 |
| 6,614,974 | B2 | | 9/2003 | Elrefaie et al. | 385/125 |
| 6,671,442 | B2 | | 12/2003 | Wang et al. | 385/125 |
| 6,687,445 | B2 | | 2/2004 | Carter et al. | 385/127 |
| 6,711,918 | B1 | * | 3/2004 | Kliner et al. | 65/390 |
| 6,766,088 | B2 | | 7/2004 | Hasegawa et al. | 385/123 |
| 6,773,825 | B2 | | 8/2004 | Pickrell et al. | 428/566 |
| 6,795,635 | B1 | | 9/2004 | Fajardo et al. | 385/140 |
| 6,904,215 | B2 | | 6/2005 | Christoff et al. | 385/124 |
| 7,039,284 | B2 | | 5/2006 | Nakahara | 385/125 |

(Continued)

FOREIGN PATENT DOCUMENTS

EP  1617243 A1  3/2004

(Continued)

OTHER PUBLICATIONS

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

(Continued)

*Primary Examiner* — John Hoffmann
(74) *Attorney, Agent, or Firm* — Robert L. Carlson

(57) ABSTRACT

Microstructured optical fiber and method of making. Glass soot is deposited and then consolidated under conditions which are effective to trap a portion of the consolidation gases in the glass to thereby produce a non-periodic array of voids which may then be used to form a void containing cladding region in an optical fiber. Preferred void producing consolidation gases include nitrogen, argon, $CO_2$, oxygen, chlorine, $CF_4$, CO, $SO_2$ and mixtures thereof.

16 Claims, 7 Drawing Sheets

U.S. PATENT DOCUMENTS

| | | | |
|---|---|---|---|
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 7,526,166 B2 * | 4/2009 | Bookbinder et al. | 385/125 |
| 2002/0054741 A1 * | 5/2002 | Brambilla et al. | 385/123 |
| 2004/0069019 A1 | 4/2004 | Carter et al. | 65/414 |
| 2005/0094954 A1 | 5/2005 | Pickrell et al. | 385/123 |
| 2006/0034574 A1 | 2/2006 | Guan et al. | 385/125 |

FOREIGN PATENT DOCUMENTS

| | | |
|---|---|---|
| EP | 1564569 A1 | 9/2004 |
| WO | WO02/102730 | 6/2001 |
| WO | WO02/075393 | 9/2002 |

OTHER PUBLICATIONS

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 23, No. 16, pp. 1409-1411.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/Leos Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

Y Bing et al, "Low-loss Holey Fiber", Hitachi Cable Review No. 24, Aug. 2005, pp. 1-5.

S Matsuo et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

* cited by examiner 25 kV  2500X  10 μm

METHOD OF MAKING AN OPTICAL FIBER HAVING VOIDS

CROSS-REFERENCE TO RELATED APPLICATIONS

This application is a divisional of and claims the benefit of priority to U.S. patent application Ser. No. 11/583098, filed on Oct. 18, 2006 now U.S. Pat. No. 7,450,806, the content of which is relied upon and incorporated herein by reference in its entirety, and also claims the benefit of priority under 35 U.S.C. §119(e) of U.S. Provisional Application Ser. No. 60/734,995 filed on Nov. 8, 2005, Provisional Application Ser. No. 60/789,798 filed on Apr. 5, 2006, and Provisional Application Ser. No. 60/845,927 filed on Sep. 20, 2006, the contents of which are relied upon and incorporated herein by reference in their entirety.

BACKGROUND OF THE INVENTION

1. Field of the Invention

The present invention relates generally to optical fibers, and more specifically to microstructured optical fibers and methods for making microstructured optical fibers.

2. Technical Background

Optical fibers formed of glass materials have been in commercial use for more than two decades. Although such optical fibers have represented a quantum leap forward in the field of telecommunications, work on alternative optical fiber designs continues. One promising type of alternative optical fiber is the microstructured optical fiber, which includes holes or voids running longitudinally along the fiber axis. The holes generally contain air or an inert gas, but may also contain other materials. The majority of microstructured fibers have a plurality of holes located around the core, wherein the holes continue for a relatively long (e.g. for many tens of meters or more) distance along the length of the fiber, and typically the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another. Examples of such microstructured fibers include those described in U.S. Pat. No. 6,243,522.

Microstructured optical fibers may be designed to have a wide variety of properties, and may be used in a wide variety of applications. For example, microstructured optical fibers having a solid glass core and a plurality of holes disposed in the cladding region around the core have been constructed. The position and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single moded over a wide range of wavelengths. Most solid-core microstructured optical fibers guide light by a total internal reflection mechanism; the low index of the holes acts to lower the effective index of the cladding region in which they are disposed.

Micro-structured optical fibers are typically manufactured by the so-called "stack-and-draw" method, wherein an array of silica rods and/or tubes are stacked in a close-packed arrangement to form a preform, that can be drawn into fiber using a conventional tower setup. There are several disadvantages to the stack and draw method. The awkwardness of assembling hundreds of very thin canes (defined by rods or tubes), as well as the possible presence of interstitial cavities when stacking and drawing cylindrical canes, may affect dramatically the fiber attenuation by introducing soluble and particulate impurities, undesired interfaces and inducing a reshaping or deformation of the starting holes. Moreover, the relatively low productivity and high cost make this method not much suitable for industrial production.

SUMMARY OF THE INVENTION

One aspect of the present invention relates to a method of making an optical fiber comprising forming via chemical vapor deposition (CVD) operation a soot containing optical fiber preform. The soot preform is consolidated in a gaseous atmosphere which surrounds the preform under conditions which are effective to trap a portion of the gaseous atmosphere in the preform during said consolidation step, thereby resulting in the formation of non-periodically distributed holes or voids in the consolidated preform, each hole corresponding to a region of at least one trapped consolidated gas within the consolidated glass preform. The consolidated preform having holes therein is then used to make an optical fiber. At least some of the holes formed in the optical fiber preform during the consolidation step remain in the drawn optical fiber. By designing the hole containing region to correspond to the cladding of the optical fiber, these resultant optical fiber can be made to exhibit a core region with a first refractive index and a cladding region having a second refractive index lower than that of the core, the lower refractive index at least partly due to the presence of the holes in the cladding. Alternatively or additional the methods disclosed herein can be used to provide a hole containing region within the cladding to thereby improve the bend performance of the optical fibers. For example, using the fiber designs and methods disclosed herein, it is possible to create optical fiber which exhibits an increase in attenuation at 1550 nm when bent around a 10 mm mandrel which is less than 20 dB/turn, more preferably less than 15 dB/turn, and even more preferably less than 10 dB/turn. Similarly, using the fiber designs and methods disclosed herein, it is possible to create an optical fiber which exhibits an attenuation increases at 1550 nm of less than 3 dB/turn, more preferably less than 1 dB/turn, even more preferably less than 0.5 dB/turn, and most preferably less than 0.25 dB/turn when bent around a 20 mm diameter mandrel. The methods and fiber designs described herein are useful for making both fibers that are single moded and fibers that are multimoded at 1550 nm.

Preferably, the voids are located substantially, and more preferably entirely in the cladding of the fiber such that they surround the core in a void containing region, and the voids are preferably substantially absent from the core region. In some preferred embodiments, the voids are located in void containing regions which are spaced apart from the core of the optical fiber. For example, a relatively thin (e.g. having a radial width less than 40 microns, and more preferably less than 30 microns) ring of a void containing region can be spaced apart from the core of the optical fiber, but not extending entirely to the outer perimeter of the optical fiber. Spacing the void containing region apart from the core will assist in lowering the attenuation of the optical fiber 1550 nm. Using a thin ring will facilitate making the optical fiber single moded at 1550 nm. The optical fiber may or may not include germania or fluorine to also adjust the refractive index of the core and or cladding of the optical fiber, but these dopants can also be avoided and instead, the voids alone can be used to adjust the refractive index of the cladding with respect to the core such that light is guided down the core of the fiber. Using the consolidation techniques disclosed, optical fibers can be formed whose cross-sections exhibit a non-periodic distribution of holes therein. By non-periodic distribution, we mean that when one views a cross section of the optical fiber, the voids are randomly or non-periodically distributed across a portion of the fiber. Cross sections taken at different points along the length of the fiber will exhibit different cross-sectional hole patterns, i.e., various cross sections will have slightly different randomly oriented hole patterns, distributions, and sizes. These holes are stretched (elongated) along the length (i.e. parallel to the longitudinal axis) of the optical fiber, but do not extend the entire length of the entire fiber. While not wishing to be bound by theory, it is believed that the holes extend less than a few meters, and in many cases less than 1 meter along the length of the fiber.

Using the void producing consolidation techniques disclosed herein, it is possible to make optical fibers having cladding regions which exhibit a total fiber void area percent (i.e., total cross-sectional area of the voids divided by total cross-sectional area of the optical fiber×100) greater than 0.01 percent, more preferably greater than 0.025 percent, even more preferably greater than 0.05 percent, even more preferably greater than about 0.1 percent and even more preferably greater than about 0.5 percent. Fibers have been made having total void area percents greater than about 1, and in fact even greater than about 5 or even 10 percent. However, it is believed that, depending on fiber design, total void area percent of less than 1, and even less than 0.7, would result in greatly improved bend performance. In some preferred embodiments, the total void area percent in said fiber is less than 20, more preferably less than 15, even more preferably less than 10, and most preferably less than 5 percent. Such void containing cladding regions can be used to lower the refractive index relative to the core and thus form the cladding region which guides light along the core of the optical fiber. By selecting the appropriate soot consolidation conditions, as will be described below, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable for the holes to be formed such that at least greater than 95% of and preferably all of the holes in the optical fiber exhibit a maximum hole size in the cladding for the optical fiber which is less than 1550 nm, more preferably less than 775 nm, most preferably less than about 390 nm. Likewise, it is preferable that the mean diameter of the holes in the fiber be less than 7000 nm, more preferably less than 2000 nm, and even more preferably less than 1550 nm, and most preferably less than 775 nm, all of which mean diameters are achievable using the methods disclosed herein. The fibers made using the methods disclosed herein can achieve these mean diameters to within a standard deviation of 1000 nm, more preferably to within a standard deviation of 750 nm, and most preferably to within a standard deviation of 500 nm. In some embodiments, the fibers disclosed herein have less than 5000 holes, in some embodiments less than 1000 holes, and in some embodiments the total number of holes is less than 500 holes in a given optical fiber perpendicular cross-section. Of course, the most preferred fibers will exhibit combinations of these characteristics. Thus, for example, one particularly preferred embodiment of optical fiber would exhibit less than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

Another aspect of the present invention relates to the microstructured optical fibers which can be made using the process described above. One such microstructured optical fiber includes a core region having a first refractive index and a cladding region having a second refractive index which is lower than that of the core region due at least partially to the presence of the non-periodically distributed voids therein. Light which is to be transmitted through the fiber is thereby retained generally within the core. The voids preferably have a maximum diameter of 1550 nm or less and the resultant optical fiber exhibits an attenuation at least one wavelength between 600 and 1550 nm (most preferably the wavelength is 1550 nm) which is less than 500 dB/km, more preferably less than 200 dB/km at 1550 nm. By "attenuation", as used herein and if not specifically designated as "multimode attenuation" or "single mode attenuation", we mean the multimode attenuation of said fiber if the fiber is multimoded at 1550 nm and the single mode attenuation if the fiber is single moded at 1550 nm. Using the void producing consolidation techniques disclosed herein, it is possible to make optical fibers having cladding regions which exhibit a regional void area percent greater than 0.5 percent, more preferably greater than about 1, even more preferably greater than about 5 and most preferably greater than about 10 percent. In particular, it is possible to produce such void containing cladding regions within a 10 micron distance of the core of the optical fiber. While index of refraction adjusting dopants may be avoided using the techniques disclosed herein, preferably at least one of germania or fluorine or a similar index of refraction adjusting dopant is employed together with the non-periodically distributed voids located in the cladding region of the optical fiber. However, use of germania and/or fluorine is not critical and, for example, the fiber could if desired be entirely or substantially devoid of both germania and fluorine. As used herein, by non-periodically distributed, we mean that the voids or holes are non-periodic, i.e., they are not periodically disposed within the fiber structure. While the methods of the present invention are not capable of periodic placement of each individual void with respect to other individual voids, as may be the case with some other types of microstructured fibers, the methods disclosed herein are capable of enabling the placement of large or small relative amounts of voids at various locations within the radial distribution of the optical fiber. For example, using the methods disclosed herein a higher regional void area percent of voids can be placed in a region which is adjacent the core of the optical fiber compared to other regions in the fiber (e.g., in the core of the fiber or the outer cladding region of the optical fiber). Likewise, the average hole size and hole size distribution in the void containing region can be controlled both in a radial and axial (i.e., along the length) direction of the fiber. Consequently, a uniform non-periodic array of holes can be located at a region in the fiber, and the relative void area percent and average hole size in this region is maintained consistently along the length of the fiber. While the fibers are not limited to any particular diameter, preferably the outer diameter of the fiber is less than 775, more preferably less than 375, and most preferably less than 200 microns.

Such a fiber can be used in telecommunication networks (typically 850, 1310 and 1550 nm windows) including long-haul, metro, access, premise and data centers as well as data communication applications and control area networks within buildings and mobile (auto, bus, train, plane) applications (typically 600 to 1000 nm range). Such telecommunications networks typically include a transmitter and receiver which is optically connected to the optical fiber. Consequently, for a variety of applications, it is desirable for the holes to be formed such that the maximum hole size in the cladding for the optical fiber is less than 1550 nm, more preferably less than 775 nm, most preferably less than about 390 nm.

Such fibers can also be used as UV to IR light-pipes for medical, illumination, lithography and industrial applications. The cladding of one preferred fiber comprises a plurality of non-periodically distributed void regions in the cladding, preferably located within a 10 micron radial distance from the core, wherein such voids having a maximum diameter, as measured in the radial direction (cross-section perpendicular to the longitudinal fiber axis) of the fiber, of 1550 nm or less, more preferably 775 nm or less. The cladding of another preferred fiber, comprises a plurality of non-periodically distributed void regions in the cladding, spaced from the core and within 20 microns radial distance from the core, wherein such voids having a maximum diameter, as measured in the radial direction of the fiber, of 1550 nm or less, more preferably 775 nm or less, most preferably less than about 390 nm. The cladding of yet another preferred fiber, comprises a plurality of non-periodically distributed void regions in the cladding, within 40 microns radial distance from the outside edge of the core, wherein such voids having a maximum diameter, as measured in the radial direction of the fiber, of 1550 nm or less, more preferably 775 nm or less, most preferably less than about 390 nm. The optical fibers disclosed herein result in a number of advantages compared to various optical fibers known in the prior art. For example, the fibers disclosed herein are capable of superior bend resistance compared to fibers of the prior art while simultaneously exhibiting excellent mode field diameters. By superior, we mean that using the methods disclosed herein, it is possible to make fibers which are single moded at 1550 nm and capable of less than 0.5 dB attenuation increase at 1550 nm per turn for a 20 mm diameter bend while simultaneously exhibiting mode field diameters greater than 10 microns, and more preferably greater than 11 microns, at 1550 nm. Such excellent bend performance makes these fibers attractive candidates for fiber-to-the-home, access fiber, fiber-in-the-home applications, and fiber jumpers (these are typically short sections of fiber (1-20 meters) with connectors on each end to connect to an optical system or device). For example, the fibers disclosed herein may be employed in an optical fiber telecommunications system comprising a transmitter, a receiver, the fiber(s) being optically connected to said transmitter and receiver. Preferably in such applications (i.e. when the fiber is acting as a transmission fiber in a telecommunications system) the fiber is devoid of any active elements such as erbium, etc.

In addition, the fibers disclosed herein can be made to have high numerical aperture (e.g. greater than 0.2, more preferably greater than 0.4, and most preferably greater than 0.6 at 1550 nm), which will facilitate their ability to be connected to other optical laser sources and increase the tolerance for fiber connectors. Such fibers are also excellent candidates for automotive applications. In such applications, it is most preferable that the fiber exhibit a maximum void size of less than about 1550 nm, more preferably less than 775 nm, and most preferably less than about 390 nm.

The fibers disclosed herein can be made using a relatively low cost manufacturing process, because expensive dopants such as fluorine and/or germania can be avoided, if desired, and the stack and draw manufacturing process can likewise be avoided. The invention will also enable flexible dispersion control (positive, flat or negative), for example, the achievement of large positive dispersion (>30 ps/nm/Km at 1550 nm) for signal processing, or negative dispersion fibers (e.g., <−200 ps/nm/Km at 1550 nm) which could be useful for dispersion compensation. Alternatively, the methods disclosed herein can be used simply to add voids to a cladding of a fiber which is doped with one or more of germania, phosphorous, aluminum, ytterbium, erbium, fluorine or other conventional fiber dopant materials, to increase the bend resistance thereof. In another alternative embodiment, the methods disclosed herein can be used to make a silica core (i.e., a fiber having no germanium dopant in the core) fiber which has a cutoff wavelength below 800 nm and a numerical aperture greater than about 0.08, more preferably greater than about 0.10 at 1550.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
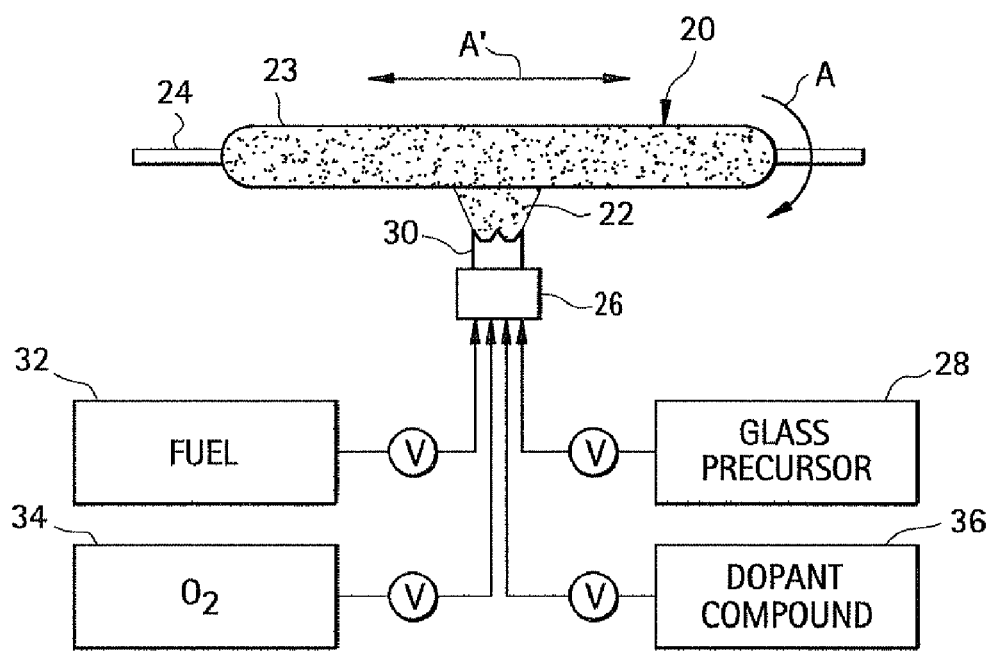
FIG. 1 illustrates an OVD method for forming a soot preform.

The methods of the present invention utilizes preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered inside a consolidation furnace into void-free glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

The present invention utilizes preform consolidation conditions which are effective to result in a significant amount of gases being trapped in the consolidated glass blank, thereby causing the formation of non-periodically distributed voids in the consolidated glass optical fiber preform. Rather than taking steps to remove these voids, the resultant preform is purposefully used to intentionally form an optical fiber with voids therein, hi particular, by utilizing relatively low permeability gases and/or relatively high sintering rates, holes can be trapped in the consolidated glass during the consolidation process. The term sintered or consolidated glass, as used herein, refers to glass that has gone through a soot consolidation step after a chemical vapor deposition soot deposition process such as the OVD or VAD processes. During the soot consolidation step, the soot goes through a densification process via exposure to high heat, thereby removing the open porosity (i.e., voids or pores between the soot which is not surrounded by densified glass) and leaving fully densified glass (although in the present invention some closed pores (i.e., voids or pores surrounded by fully densified glass) obviously remain. Such soot consolidation step preferably takes place in a soot consolidation furnace. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

In one preferred embodiment of the invention, the non-periodically distributed holes or voids which are present in the optical fiber as a result of using the processes disclosed herein are located in the cladding of the optical fiber. Such voids can be used to lower refractive index. By designing the consolidation parameters so that the maximum diameter of the holes or voids is less than the wavelength of the light which is to be transmitted along the length of the fiber (e.g. in the case of optical fibers for use in telecommunications applications, less than 1550 nm), the fiber may be effectively used to transmit information at a particular wavelength.

FIG. 1 illustrates a method of manufacturing a soot optical fiber preform 20 which can be used in accordance with the present invention. In the embodiment illustrated in FIG. 1, soot preform 2 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane ($CH_4$), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g. in the core of the fiber), or a fluorine containing compound may be included to lower the index of refraction (e.g. in the cladding and/or void containing region of the fiber).

Figure 3:
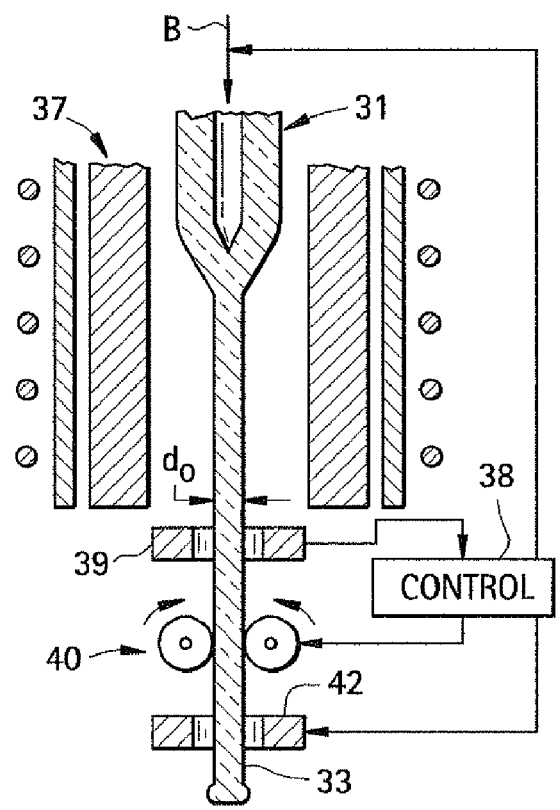
FIG. 3 illustrates a redraw process for forming a core cane.
Figure 2:
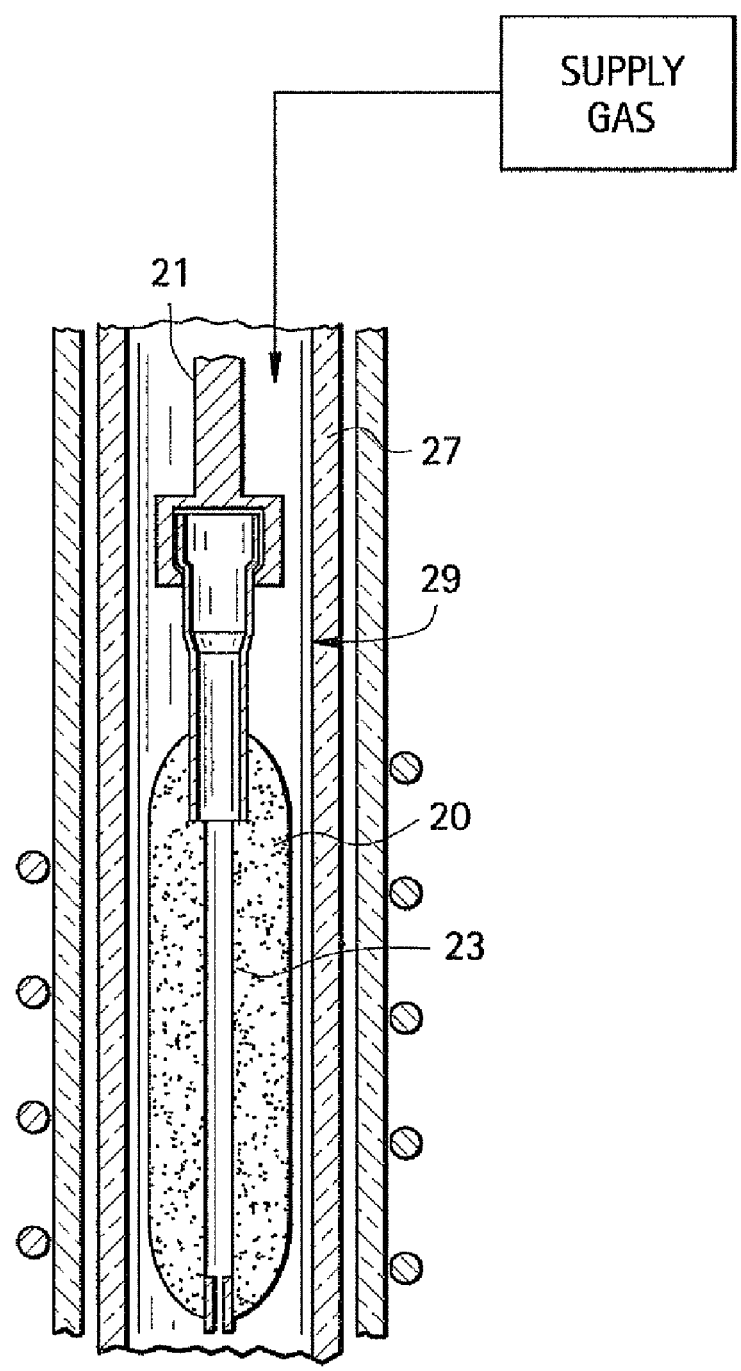
FIG. 2 illustrates a cross-sectional side view of a consolidation process in accordance with the invention.

As illustrated in FIG. 2, the soot preform 20 including the cylindrical soot region 23 may be consolidated in a consolidation furnace 29 to form a consolidated blank 31 (shown in subsequent FIG. 3). Prior to consolidation, the mandrel 24 illustrated in FIG. 1 is removed to form a hollow, cylindrical soot blank preform. During the consolidation process, the soot preform 20 is suspended, for example, inside a pure quartz muffle tube 27 of the consolidation furnace 29 by a holding mechanism 21. Preferably, before the consolidation step the preform 20 is exposed to a drying atmosphere. For example, a suitable drying atmosphere may include about 95 percent to 99 percent helium and 1 percent to 5 percent chlorine gas at a temperature of between about 950° C. and 1250° C. and a suitable drying time ranges from about 0.5 and 4.0 hours. The soot preform can also be doped, if desired, for example using a dopant gas having fluorine or other optical fiber dopants therein. For example, to dope with fluorine, $SiF_4$ and/or $CF_4$ gas maybe employed. Such dopant gases maybe employed using conventional doping temperatures, for example between about 950 and 1250° C. for 0.25 to 4 hours.

During the consolidation step, which preferably takes place after a soot drying step, the furnace temperature is raised and the preform 20 is consolidated at a suitable temperature, for example between about 1390° C. and 1535° C. to form a consolidated preform. Alternatively, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform maybe held in an isothermal zone which is maintained at a desired drying temperature (950-

4250° C.), after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./mm, more preferably greater than 14° C./min. Preferably, the first consolidation rate results in the outside of the preform increasing in temperature at a rate which is greater than 2, more preferably greater than 10, even more preferably greater than about 20, and most preferably greater than 50° C. /min higher than the heating rate of the second consolidation rate. If desired, a third consolidation step or even 5 or more additional consolidation steps can be employed which heats at a slower rate (e.g. less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot.

Preferred sintering gases (i.e., the gas that surrounds the preform during the sintering step) which may be used in the consolidation step are those which comprise at least one gas selected from the group consisting of nitrogen, argon, $CO_2$, oxygen, chlorine, CF4, CO, SO2, krypton and mixtures thereof. Each of these gases exhibits a relatively low permeability in silica glass at or below the consolidation temperature which is suitable for forming voids in accordance with the methods present invention. Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. It some of the embodiments described herein, e.g. when additional soot is planned to be deposited via OVD to the resultant glass perform or cane subsequent to the void producing consolidation process, it is preferable to utilize a sintering gas which employs less than 10 percent oxygen, more preferably less than 5 percent oxygen, and most preferably essentially no oxygen, otherwise due to exposure to hydrogen formed in the OVD process, some seeds might be lost. Generally speaking, the greater the percentage by volume of void producing gases (nitrogen, Ar, $CO_2$, $O_2$, $Cl_2$, CF4, CO, SO2, krypton, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, and krypton, and mixtures thereof. These gases can be utilized entirely alone or in mixtures of such gases along with a carrier gas such as helium. One particularly preferred void producing gas is nitrogen. Applicants have found when employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g. nitrogen, argon, $CO_2$, oxygen, Chlorine, CF4, CO, SO2) under a partial vacuum (e.g., wherein the preform is immersed in a sintering atmosphere is at a pressure of between about 40 to 750 Torr). Using the void producing consolidation techniques disclosed herein, it is possible to make optical fibers having a cladding comprises a void containing region having a void regional void area percent greater than 0.5 percent, more preferably greater than about 1, even more preferably greater than about 5 and most preferably greater than about 10 percent. Regional void area percent, as used herein, means the total area of the voids in a void containing region divided by the total area of the void containing region (when the optical fiber is viewed in cross-section taken perpendicular to the axis of the optical fiber) times 100, the void containing region being defined by the inner and outer boundaries of the void containing region. For example, if the inner edge of the innermost void in the fiber has a radial location of 4 microns from the axial centerline of the fiber, and the outer edge of the outer most void in the fiber has a radial location of 60 microns from the centerline, then the area of the void containing region is approximately 11309−50=11259 square microns. If the total cross sectional area of voids contained in this void containing region is 1100 square microns, then the void area percent of the void containing region is approximately 9.8 percent.

Using the preferred sintering gases described above, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably are greater than 1100° C., more preferably greater than 1300° C., even more preferably greater than 1400° C., and most preferably greater than 1450° C. One particularly preferred sintering temperature is approximately 1490° C.

FIG. 3 illustrates a process which may be used to draw a core cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g. undoped silica cladding). The resultant consolidated core blank 31 is placed in a core cane draw furnace 37 and at least one rod-shaped core cane segment 33 having a reduced outer diameter is drawn therefrom. The preform blank 31 is heated to a temperature of for example, between about 1700° C. and 2000° C. The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm. This core cane can then be used as the target or mandrel 24 for additional soot deposition or as the rod in a rod in tube process, as will be described further below.

Figure 4:
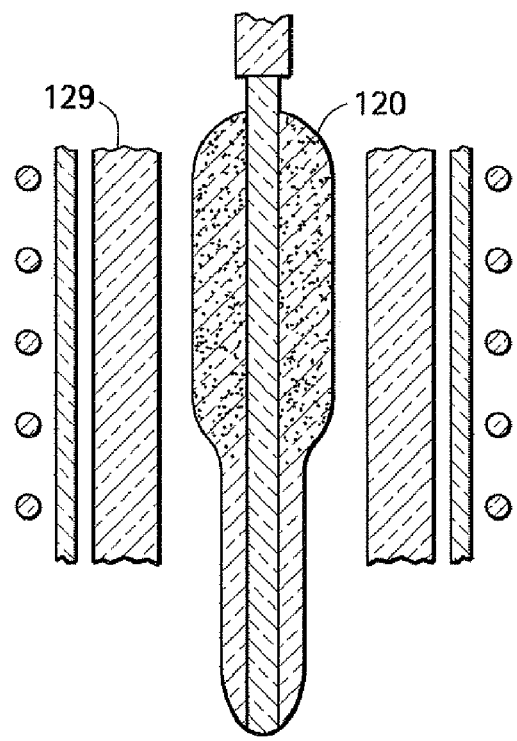
FIG. 4 illustrates consolidation of soot which has been deposited onto a core cane.
Figure 5:
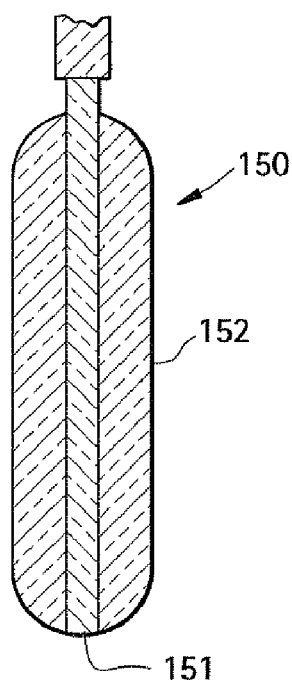
FIG. 5 illustrates the fully consolidated preform which results from the consolidation step illustrated in FIG. 4.

In one preferred embodiment, the process described above with respect to FIG. 3 can be used to form a core cane blank which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a void containing consolidated optical fiber preform 150, as illustrated in FIG. 5.

As described above, preferred gases for use in the void forming consolidation step include at least one gas selected from the group consisting of nitrogen, argon, $CO_2$, oxygen, Chlorine, CF4, CO, SO2, krypton, and mixtures thereof. Preferably these void producing gases are employed either alone or in combination in an amount between 5 and 100 percent by volume, more preferably between about 20-100 percent by volume and most preferably between about 40 and 100 percent by volume. The remainder of the sintering gas atmosphere is made up of a suitable diluent or carrier gas such as, for example, helium, hydrogen, deuterium, or mixtures thereof. Generally speaking, the greater the percentage of void producing gases (nitrogen, Ar, $CO_2$, Kr, $O_2$, $Cl_2$, CF4, CO, SO2) employed in the sintering gas, the larger and more abundant the voids will be in the resultant consolidated glass. One particularly preferred void producing gas is nitrogen, which is preferably employed in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as, for example, helium. Voids can also be created by sintering the soot in a low permeability diluent gas (e.g. nitrogen, argon, $CO_2$, oxygen, Chlorine, CF4, CO, SO2) under a partial vacuum (e.g., wherein the sintering atmosphere is at a pressure of between about 40 to 750 Torr), and in such cases use of a diluent relatively high permeability gas such as helium is not necessary. Using the void producing consolidation techniques disclosed herein, it is possible to make optical fibers whose cladding comprises a void containing region having a regional void area percent greater than 0.5 percent, more preferably greater than about 1 percent. It is even possible using these techniques to achieve greater than about 5 and even greater than about 10 percent regional void area percent. The regional void area percent is preferably less than 50 percent, more preferably less than 20 percent. Most preferably, the region having holes does not extend to the outer edge of the cladding such that there are open voids or holes on the outside of the fiber.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming holes in the consolidated glass. These gas containing voids are preferably not entirely outgassed prior to and/or during the fiber draw process, so that the voids remain in the fiber after the fiber has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the holes. Selection of a gas that is more permeable in glass at the consolidation temperature will result in smaller voids. Sintering rate can also have a significant effect on hole size and hole quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more holes (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 microns. Such preforms can be used, for example, to make optical fibers having cladding regions which alternate between regions of void free glass and void containing glass.

Fibers having such alternating void containing and void-free regions would exhibit properties useful as Bragg gratings.

Referring to FIG. 5, using the techniques described above, an optical fiber preform 150 can be formed which comprises a void-free core region 151 which is surrounded by a cladding 152 which is comprised of a plurality of voids. By forming the void containing region in cladding 152 with a sufficient number of voids of an appropriate size, cladding 152 will serve as an optical cladding which guides light along core region 151 after the optical fiber preform is drawn into an optical fiber. Alternatively, the void containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6:
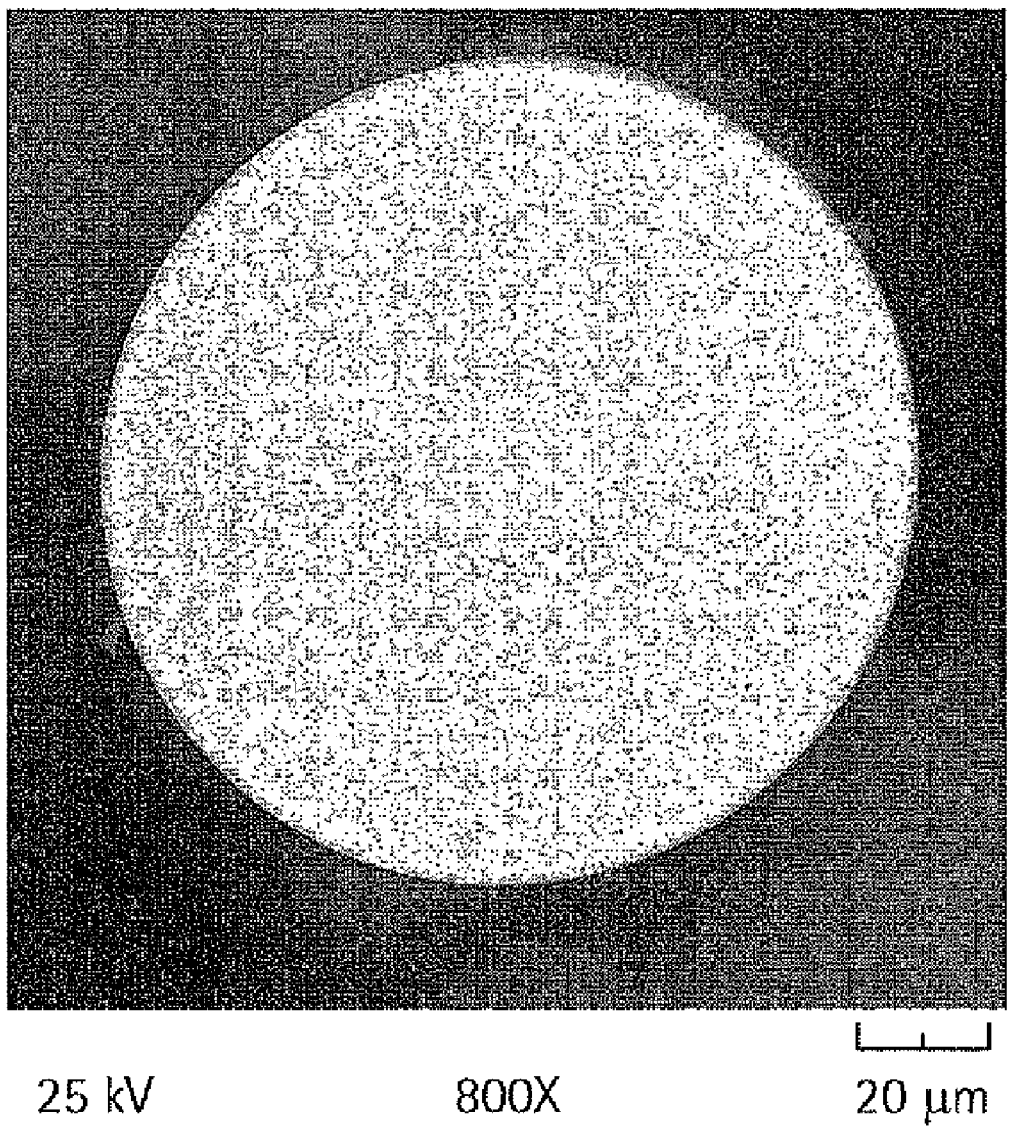
FIG. 6 illustrates a photomicrograph of a fiber made in accordance with one embodiment of the invention.

An example of a fiber which is drawn from such a preform is illustrated in FIG. 6. The fiber is FIG. 6 comprises a pure silica core region which is surrounded by a cladding region which comprises voids which are positioned to be effective to guide light along the silica core. The fundamental mode of the fiber of FIG. 6 exhibited an attenuation of 0.28 dB/km at 1550 nm, even though this fiber was made using relatively crude experimental manufacturing equipment. However, using more suitable equipment, attenuations of less than 0.2 dB/km at 1550 nm are certainly possible.

Figure 7:
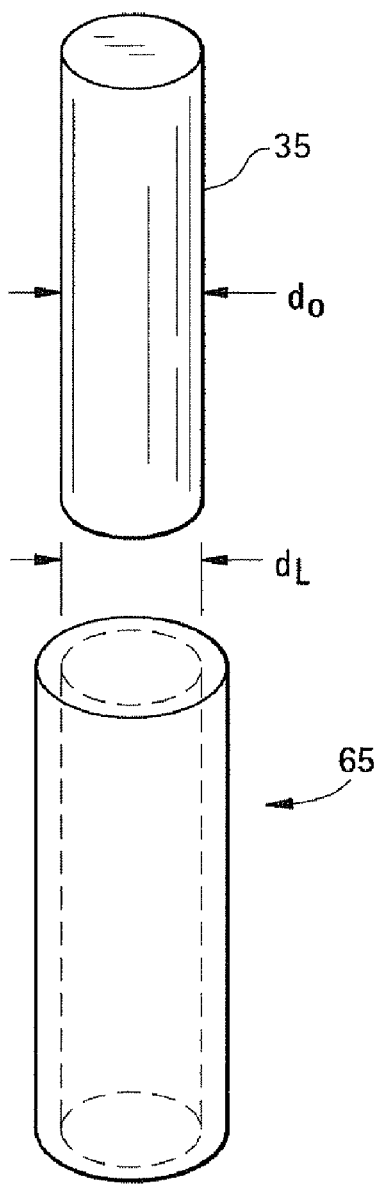
FIGS. 7 and 8 together illustrate a rod in tube manufacturing process which may be employed with various methods of the present invention.
Figure 8:
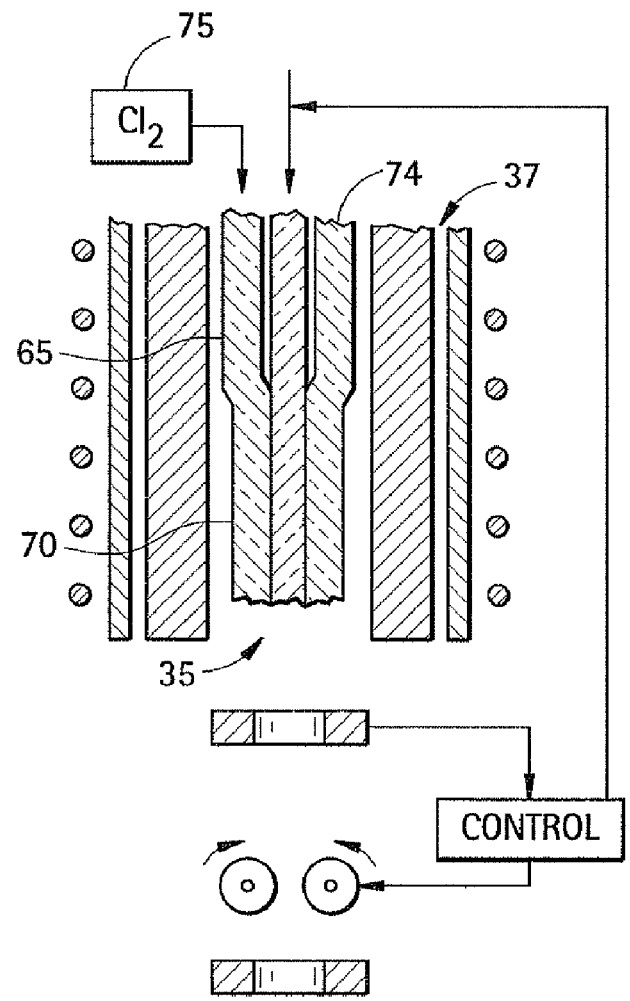

Alternatively, instead of depositing soot onto an already formed core cane, the void forming process described above can be used to form a tube of consolidated glass having a void containing region therein as described above with respect to FIG. 2, and that tube can be used to sleeve a core cane. For example, the above described process can be used to form a soot preform onto a removable mandrel 24, after which time the mandrel is removed and the soot preform is consolidated as described above to form a consolidated glass tube having voids therein. The resultant tube 65 which contains voids therein can be used to sleeve a core cane 35. Such sleeving can be accomplished, for example, using conventional rod in tube manufacturing techniques, as illustrated in FIGS. 7 and 8. In FIG. 7, pure (i.e., substantially free of index of refraction increasing dopants such as germanium) silica core cane 35 is inserted into void containing cladding sleeve portion 65, although alternatively the core region or the cladding could be doped with conventional index adjusting dopants such as germanium or fluorine. In FIG. 8, core cane 35 and cladding sleeve portion 65 are heated to a suitable temperature (e.g., greater than about 1300 to 1500° C.) and then redrawn to a smaller diameter using well known rod in tube manufacturing process steps, thereby forming an optical fiber preform from which can be drawn an optical fiber having a pure silica core region surrounded by a void containing cladding region in accordance with the invention.

Figure 9:
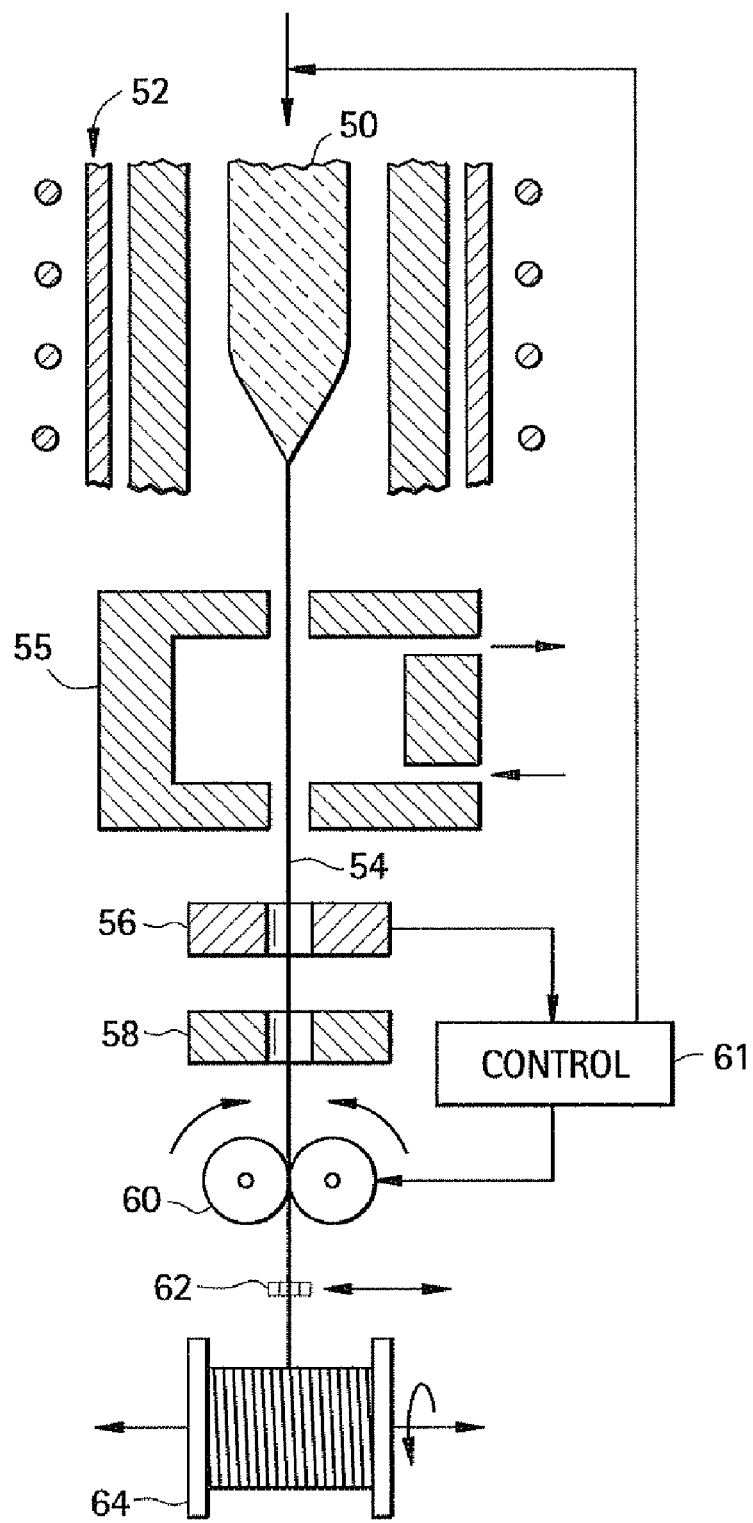
FIG. 9 illustrates a draw process and apparatus that maybe employed in the method of the present invention.
Figure 10:
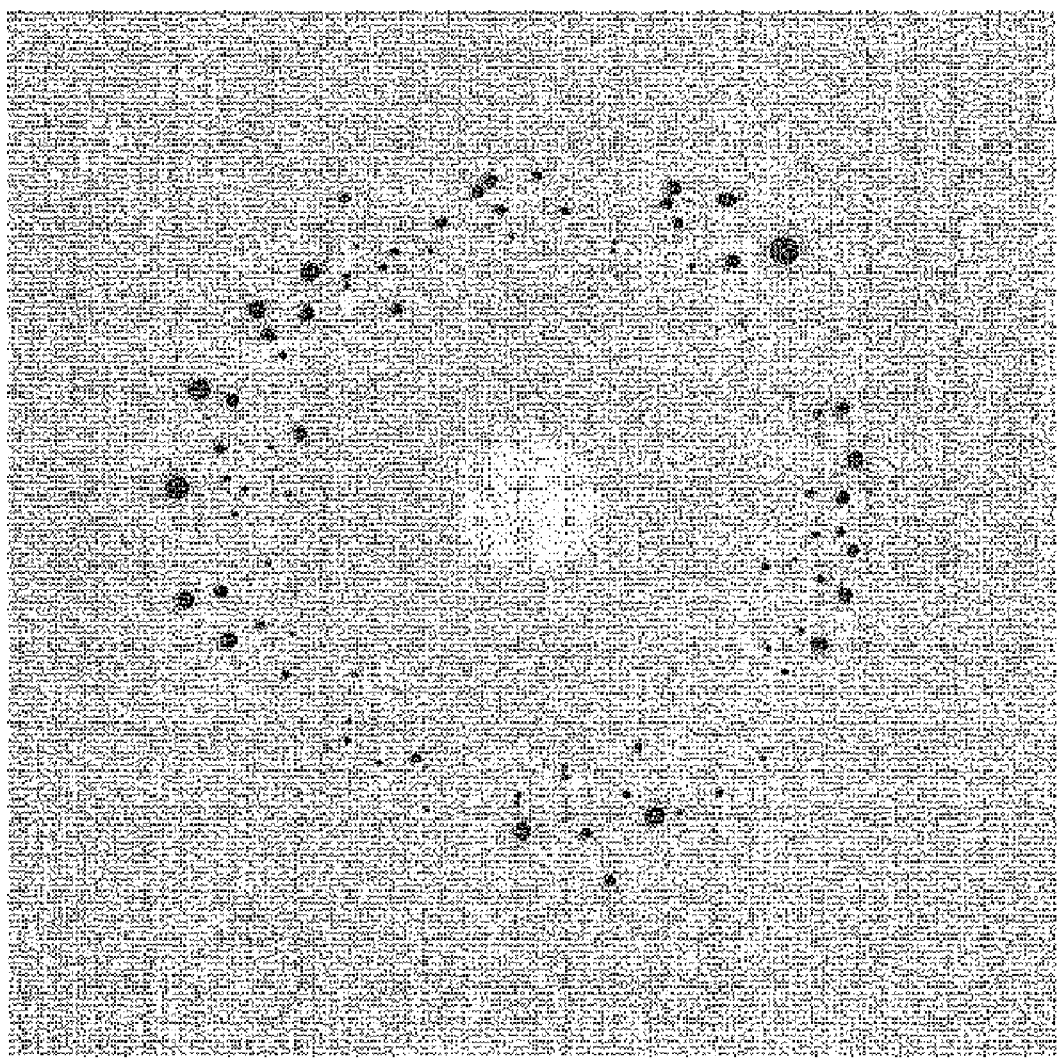
FIG. 10 illustrates an SEM photomicrograph of a fiber made in accordance with one embodiment of the invention.

In any of the embodiments disclosed herein, the resulting final consolidated optical fiber preform 50 may be drawn into an optical fiber by positioning the preform within a draw furnace 52 as shown in FIG. 9, and then heating and drawing the optical fiber 54 using conventional methods and apparatus. The fiber 54 is then cooled in cooling chamber 55 and measured for final diameter by non-contact sensor 56, One or more coatings may be applied and cured by coating apparatus 58, as is also conventional. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

The same process described above with respect to FIG. 3 for forming core canes can alternatively be used to redraw void containing consolidated tubes. Such a redraw process can be used to modify the size of the voids contained in the tube. For example, the greater the diameter reduction that occurs when the void containing perform is redrawn, the smaller the void size will be in that preform.

Using the void producing consolidation techniques disclosed herein, optical fibers have been achieved which are comprised of a core region having a first refractive index and a cladding region having a second refractive index lower than that of the core such that light which is transmitted through the fiber is retained generally within the core, whereby said voids are located in and thereby form the cladding of said optical fiber and the void area percent of the voids is substantially non-zero.

Using the techniques described herein, fibers can be made wherein the maximum size of any of the voids, in the region where the fraction of power of light is greater than 80 percent, is less than the wavelength of light being transmitted for applications relating to telecommunications automotive applications. By maximum size, we mean the maximum diameter of any particular void when the optical fiber is viewed along the axial direction of the fiber in perpendicular cross-section. For example, fibers have been made wherein the maximum size of all of said voids, in the region where the fraction of power of light is greater than 80 percent, and even more preferably in the region where the fraction of power of light is greater than 90 percent, is less than 5 microns, more preferably less than 2 microns, even more preferably less than 1 micron, and most preferably less than 0.5 microns.

Using the techniques described herein, fibers can be made having void containing regions which exhibit regional void area percents of greater than 1 percent, more preferably greater than 10 percent, and most preferably greater than 30 percent.

The process described above has been generally limited to making silica core optical fiber, i.e., fibers having a relatively pure silica core region surrounded by a void containing cladding region. Alternatively, index adjusting dopants such as germanium and fluorine can be used, if desired, either individually or together, to further adjust the refractive index of the core with respect to the index of refraction of the cladding. For example, in one such preferred embodiment, a germanium core cane is used as a starter rod, upon which additional soot cladding material is deposited, preferably using OVD deposition techniques as described above. The soot cladding region is then consolidated as described above to form a void containing cladding region around the germania doped silica core region. In another alternative embodiment involving index adjusting dopants, a silica core cane is employed as the starter rod for a soot cladding region. However, during the void producing consolidation step, in addition to the void producing dopant gas, a fluorine dopant source is provided (e.g. $SiF_4$ gas) to simultaneously dope the void containing region with fluorine. In this way, a fluorine doped void containing region can be formed around a silica core region.

EXAMPLES

The invention will be further illustrated by the following examples.

Step 1—Core cane preparation: 8 and 15 mm diameter pure silica core canes were made via standard OVD processing. $SiO_2$ soot (0.5 g/cc density) was first deposited onto a removable bait rod, then the bait rod was removed and the resultant soot was consolidated using standard consolidation (2 hour dry in helium +3 percent chlorine @1000° C.) followed by down driving through a hot zone set at 1500° C. at 6 mm/minute downfeed rate (corresponding to 3° C./min heat up rate) in a He only atmosphere in order to sinter the soot into clear void-free consolidated glass blank. The blank was then redrawn at 1900° C. under less than 500 Torr (partial vacuum) to the centerline to close the centerline hole and result in void free consolidated silica core canes having a diameter of 8 mm or 15 mm. Unless otherwise noted, in each of the examples below, when the fiber was drawn the fiber was coated using conventional coatings (i.e. conventional acrylate based primary and secondary coatings).

Example 1

3000 grams of $SO_2$ (0.48 g/cc density) soot were deposited using an outside vapor deposition process to form an $SiO_2$ soot blank, i.e., by depositing onto a 1 meter long×10 mm diameter removable alumina bait rod. The alumina bait rod was removed and an 8 mm diameter core cane consisting of pure (undoped) consolidated silica was inserted into the $SiO_2$ soot blank. This rod in soot assembly was then sintered as follows. The assembly was first dried for 2 hours in an atmosphere of 97 percent helium and 3 percent chlorine at 1000° C. followed by down driving at 32 mm/min (resulting in an increase in temperatures of the preform of approximately 16° C./min.) through a hot zone set at 1500° C. in a 100 percent nitrogen sintering atmosphere. The preform assembly was than re-down driven (i.e., a second time) through the hot zone at 25 mm/min (approximately 12.5° C./min. heat up rate of the preform), then final sintered at 6 mm/min (approximately 3° C./min heat up rate) in order to sinter the soot into a nitrogen-seeded overclad blank. The first higher downfeed rate was employed to glaze the outside of the optical fiber preform, which facilitates trapping of the gases in the preform. The blank was then placed for 24 hours in an argon purged holding oven set at 1000° C.

The resultant optical fiber preform was drawn into a 125 micron diameter optical fiber at 1 m/s using a draw furnace having a hot zone of about 2.54 cm length and set at 2100° C. SEM analysis (FIG. 6) of the end face of a cross-section of the resultant optical fiber showed about 22 micron diameter solid silica core and a cladding containing 3.5 regional void area percent (area of holes divided by area of the hole containing region×100) with an average diameter of 0.3 microns (300 nm) and a maximum hole diameter of 0.50 microns (500 nm) with a standard deviation of 0.08 microns, and comprising approximately 3400 holes, resulting in about 7900 total number of holes across the entire fiber cross-section. The fiber's total void area percent (area of the holes divided by total area of the optical fiber cross-section×100) was about 3.4 percent. Optical properties for this fiber were 2.2 dB/Km at 1550 nm as a multimode attenuation and 0.28 dB/km at 1550 nm for the fundamental mode.

Example 2

3000 grams of SiO2 (0.47 g/cc density) soot were flame deposited onto a 1 meter long×8 mm diameter pure silica core cane. This assembly was then sintered as follows. The assembly was first dried for 2 hours in an atmosphere consisting of helium and 3 percent chlorine at 1000° C. followed by down driving at 32 mm/min through a hot zone set at 1500° C. in a 70 percent nitrogen and 30 percent helium (by volume) atmosphere, then re-down driven through the hot zone at 25 mm/min, then final sintered at 6 mm/min, in order to sinter the soot to a nitrogen/helium-seeded overclad blank. The blank was placed for 24 hours in an argon purged holding oven set at 1000° C. to outgas the helium from the blank.

The blank was drawn to 125 micron diameter fiber in a manner similar to Example 1. SEM analysis of the end face of a fiber showed about 22 micron diameter solid silica core and a cladding containing 4.5 regional void area percent nitrogen filled voids with an average diameter of 0.45 microns and the smallest diameter holes at 0.03 microns and a maximum diameter of 1.17 microns with a standard deviation of 0.19 microns, and comprising approximately 2300 holes, resulting in about 8400 total number of holes across the entire fiber cross-section. The total fiber void area percent (area of the holes divided by total area of the optical fiber cross-section× 100) was about 4.4 percent. Optical properties for this fiber were 9.8 dB/Km at 1550 nm when measured as a multimode attenuation.

Example 3

3000 grams of SiO2 (0.46 g/cc density) soot were flame deposited onto a 1 meter long×8 mm diameter pure silica core cane from Step 1. This assembly was then sintered as follows. The assembly was first dried for 2 hours in an atmosphere consisting of 3 percent chlorine gas, the remainder helium, at 1000° C. followed by down driving at 32 mm/min through a hot zone set at 1500° C. in a 50 percent nitrogen/50 percent helium (by volume) atmosphere. The assembly was then re-down driven through the same hot zone at 25 mm/min, after which the assembly was re-down driven through the same hot zone for final sintering at 6 mm/min) in order to sinter the soot to a nitrogen/helium-seeded overclad blank. The blank was placed for 24 hours in an argon purged holding oven set at 1000° C. to outgas the helium from the preform blank.

The resultant optical fiber preform was drawn to 125 micron diameter fiber in a manner similar to Example 1. SEM analysis of the end face of a fiber showed a 22 micron diameter solid silica core and a cladding containing 2.6 regional void area percent (nitrogen) with an average diameter of 0.42 microns and the smallest diameter holes at 0.03 microns and a maximum diameter of 0.80 microns with a standard deviation of 0.14 microns, and comprising approximately 2300 holes, resulting in about 5700 total number of holes in the fiber cross-section. The total fiber void area percent (area of the holes divided by total area of the optical fiber cross-section×100) was about 2.5 percent. Optical properties for this fiber were 11.9 dB/Km at 1550 nm when measured as a multimode attenuation.

Example 4

3000 grams of SiO2 (0.40 g/cc density) were flame deposited onto a 1 meter long×8 mm diameter pure silica core cane from Step 1. This assembly was then sintered as follows. The assembly was first dried for 2 hours in an atmosphere of He and 3 percent chlorine at 1000° C., followed by down driving the assembly at 32 mm/min through a hot zone set at 1500° C. in an atmosphere consisting of 30 percent nitrogen/70 percent helium (by volume). The assembly was then re-down driven through the same hot zone and atmosphere at 25 mm/min, after which the assembly was again driven through the same hot zone and atmosphere for final sintering at 6 mm/min) in order to sinter the soot to a nitrogen/helium-seeded overclad blank. The blank was then placed for 24 hours in an argon purged holding oven set at 1000° C. to outgas the helium from the blank.

The resultant optical fiber preform was drawn to a 125 micron diameter optical fiber in a manner similar to Example 1. SEM analysis of the end face of a fiber showed a 22 micron diameter solid silica core and a cladding containing 2.0 regional void area percent (nitrogen) with an average diameter of 0.37 microns and the smallest diameter holes at 0.03 microns and a maximum diameter of 0.89 microns with a standard deviation of 0.13 microns, and comprising approximately 2100 holes, resulting in about 8100 total number of holes in the fiber cross-section. The total fiber void area percent (area of the holes divided by total area of the optical fiber cross-section×100) was about 2.6 percent. Optical properties for this fiber were 4.4 dB/Km at 1550 nm when measured as a multimode attenuation.

Example 5

3000 grams of SiO2 (0.38 g/cc density) were flame deposited onto a 1 meter long×8 mm diameter pure silica core cane from Step 1. This assembly was then sintered as follows. The assembly was first dried for 2 hours in a helium and 3 percent chlorine atmosphere @1000° C. followed by down driving at 32 mm/min through a hot zone set at 1500° C. in a 15 percent nitrogen/85 percent helium (by volume) atmosphere. The assembly was then re-down driven through the same hot zone and sintering atmosphere at 25 mm/min, after which the assembly was again driven through the same hot zone and sintering atmosphere for the final sintering step at 6 mm/min in order to sinter the soot to a nitrogen/helium-seeded overclad blank. The blank was then placed for 24 hours in an argon purged holding oven set at 1000° C. to outgas the helium from the blank.

The resultant optical fiber preform was drawn to 125 micron diameter fiber in a manner similar to Example 1. SEM analysis of the end face of a fiber showed a 22 micron diameter solid silica core and a cladding containing 2.0 regional void area percent (nitrogen) with an average diameter of 0.37 microns and the smallest diameter holes at 0.03 microns. Optical properties for this fiber were 9.1 dB/Km at 1550 nm when measured as a multimode attenuation.

Example 6

3000 grams of SiO2 (0.5 g/cc density) were deposited onto a 1 meter long×10 mm diameter removable alumina bait rod; after soot deposition, the alumina bait rod was removed. This assembly was then sintered as follows. The assembly was first dried for 2 hours in an atmosphere consisting of helium +3 percent chlorine at 1000° C., followed by down driving at 32 mm/min through a hot zone set at 1500° C. in a 100 percent nitrogen atmosphere. The assembly was then re-down driven through the same hot zone and atmosphere at 25 mm/min, after which the assembly was again down driven through the same hot zone and atmosphere for final sintering at 6 mm/min in order to sinter the soot to a nitrogen/helium-seeded overclad blank. The blank was then placed for 24 hours in an argon purged holding oven set at 1000° C. to outgas the helium. A 3 mm pure silica core cane from Step 1 was inserted into the centerline of nitrogen-seeded SiO2 glass blank.

The resultant optical fiber preform was then drawn to 125 micron diameter fiber in a manner similar to Example 1 with <250 torr (vacuum) pulled on the centerline from the top of the blank to assure cladding mating to the core cane during the draw process. SEM analysis of the end face of a fiber showed 8 micron diameter solid silica core and a cladding containing 4.0 regional void area percent (nitrogen) with an average diameter of 0.33 microns and the smallest diameter holes at 0.03 microns and a maximum diameter of 0.82 microns with a standard deviation of 0.14 microns, and comprising approximately 4100 holes. Optical properties for this fiber showed that it was single moded at wavelengths above about 800 nm and attenuation was 4.8 and 4.5 dB/Km at 850 and 1550 nm respectively, and a mode field diameter at 1550 nm of about 11 microns. This fiber showed high bend resistance; it had very low attenuation increase of only 2-8 dB at 1550 nm per turn when wrapped around a 10 mm diameter mandrel (as compared to a standard commercially available SiO2-Ge02 0.35delta step index conventional single mode fiber which had approximately 25 dB attenuation delta per turn at 1550 nm for the same radius of bending). This indicates that void containing clad fibers of the present invention can be made to exhibit less than 40, more preferably less than 30, even more preferably less than 20, and most preferably less than 10 dB bend induced attenuation delta (i.e., attenuation increase) per turn at 1550 nm (i.e., the attenuation measured on a straight length minus the attenuation measured on same length of fiber wrapped around a mandrel) when wrapped around a 10 mm diameter mandrel.

Example 7

3000 grams of SiO2 (0.5 g/cc density) were flame deposited onto a 1 meter long×8 mm diameter cane having a step index with a small pedestal (0.39 percent delta step from 0 to 1.3 mm radius from center of cane, 0.06 percent delta pedestal from 1.3 to 2.3 mm radius from center of cane and pure silica from 2.3 to 4 mm radius from center of cane) GeO2-SiO2 core-pedestal with SiO2 clad cane made similar to the process used to make a cane from Step 1. This assembly was then sintered as follows. The assembly was first percent held for 2 hours in a 100 percent air atmosphere (~78% N2+~21% O2+~1% A+~0.03% CO2, by volume) at 1000° C. followed by down driving the assembly at 6 mm/min through a hot zone set at 1500° C. in a 100 percent air atmosphere (~78% N2+~21% O2+~1% Ar+~0.03% CO2, by volume) in order to sinter the soot to a air-seeded (~78% N2+~21% O2+~1% Ar+~0.03% CO2, by volume) overclad blank. The blank was placed for 24 hours in an argon purged holding oven set at 1000° C.

The resultant optical fiber preform was drawn to 125 micron diameter fiber in a manner similar to Example 1. SEM analysis of the end face of a fiber showed an approximately 22 micron radius void-free solid core cane (containing the GeO2-SiO2 core as described in the above cane), surrounded by an approximately 39 micron outer radius void containing cladding region and a cladding ring of holes holes comprising 2.9 regional void area percent (air (~78% N2+~21% O2+~1% Ar+~0.03% CO2, by volume)) with an average diameter of 0.29 microns and the smallest diameter holes at 0.03 microns and a maximum diameter of 1.4 microns, which is surrounded by a void-free pure silica outer cladding having an outer diameter of 125 microns (all radial dimensions measured from the center of the optical fiber).resulting in about 350 total number of holes in the fiber cross-section. Because of the relatively slow downdrive and sinter rate, the holes were located adjacent to the region corresponding to where the GeO$_2$-SiO$_2$ core-SiO$_2$ clad core cane was during consolidation and extending out from a radial distance from the fiber centerline of 22 microns to about 39 microns radial distance across the fiber cross-section. The total void area percent (area of the holes divided by total area of the optical fiber cross-section×100) was about 0.12 percent. Optical properties for this fiber were 2.94, 1.58 and 1.9 dB/Km at 850, 1310 and 1550 nm, respectively, when measured as a multimode attenuation and, 0.42 and 0.29 dB/Km @1310 and 1550 nm, respectively, for the fundamental mode when spliced to a single moded fiber.

Example 8

The consolidated blank made in Example 2 was redrawn to 8 mm canes at 1900 C. in a redraw furnace. An overclad of 750 grams of SiO2 (0.54 g/cc density) soot were flame deposited onto a 1 meter long×8 mm diameter cladded core cane (i.e. a pure silica core, airline clad made via 70 percent nitrogen +30 percent helium in Example 2). This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere. The blank was placed for 24 hours in an argon purged holding oven set at 1000° C. to outgas the helium from the blank. The overclad portion located outside of the hole containing cladding region was void free consolidated glass containing no holes.

The blank was drawn to 125 micron diameter fiber in a manner similar to Example 1. SEM analysis of the end face of a fiber showed about 4 micron radius solid silica core surrounded by an approximately 18 micron radius airline-containing near clad region comprising 2.9 regional void area percent (nitrogen) with an average diameter of 0.45 microns and the smallest diameter holes at 0.03 microns and a maximum diameter of 1.26 microns, a standard deviation of 0.19 microns, and comprising approximately 300 holes. The overclad portion located outside of the airline containing cladding region was void free consolidated glass containing no holes (all radial dimensions measured from the center. The total fiber void area percent (area of the holes divided by total area of the optical fiber cross-section×100) was about 3.4 percent. The multimode attenuation for this fiber was 10.5 dB/Km at 1550 nm.

Example 9

7000 grams of SiO2 (0.5 g/cc density) were flame deposited onto a 1 meter long×22 mm diameter step index (0.35 percent delta, 0.33 core/clad diameter ratio) GeO2-SiO2 core-SiO2 clad cane similar to the process used to make a cane from Step 1. This assembly was then sintered as follows. The assembly was first dried for 2 hours in helium +3 percent Chlorine at 1000° C. followed by down driving the assembly at 32 mm/min through a hot zone set at 1500° C. in a 2 percent CO and 98 percent helium (by volume) atmosphere. The assembly was then re-down driven through the same hot zone and sintering atmosphere at 25 mm/min, after which the assembly was again driven through the same hot zone and sintering atmosphere for the final sintering step at 6 mm/min in order to sinter the soot to a CO/helium-seeded overclad blank. The blank was placed for 24 hours in an argon purged holding oven set at 1000° C.

The resultant optical fiber preform was drawn to 125 micron diameter fiber in a manner similar to Example 1. SEM analysis of the end face of a fiber showed a 24 micron diameter solid core and inner cladding (8 micron diameter GeO2-SiO2 core, 24 micron diameter SiO2 inner cladding) and an overcladding containing 1.8 regional void area percent (CO) with an average diameter of 0.41 microns and the smallest diameter holes at 0.03 microns and a maximum diameter of 0.84 microns with a standard deviation of 0.21 microns, and comprising approximately 1100 holes. Optical properties for this fiber were 1.95, 1.44 and 0.72 dB/Km at 850, 1310 and 1550 nm, respectively, when measured as a multimode attenuation and 0.30 and 0.43 dB/Km at 1310 and 1550 nm, respectively, when spliced to a single moded fiber and measuring the fundamental mode for this fiber.

Example 10

3000 grams of SiO2 (0.4 g/cc density) were deposited onto a 1 meter long×10 mm diameter removable alumina bait rod; after soot deposition, the alumina bait rod was removed. This assembly was then sintered as follows. The assembly was first dried for 2 hours in an atmosphere consisting of helium plus 3 percent chlorine at 1000° C., followed by down driving at 32 mm/min through a hot zone set at 1500° C. in a 100 percent CF4 atmosphere. The assembly was then re-down driven through the same hot zone and atmosphere at 25 mm/min, after which the assembly was again down driven through the same hot zone and atmosphere for final sintering at 6 mm/min in order to sinter the soot to a CF4 (and/or CF4-gas reaction products with the silica including CO and CO2)-seeded overclad blank. The blank was then placed for 24 hours in an argon purged holding oven set at 1000° C.

The resultant optical fiber preform was then drawn to 125 micron diameter fiber in a manner similar to Example 1 except back pressure of ~850 Torr positive pressure of nitrogen was kept on the centerline to keep the center hole open. SEM analysis of the end face of a fiber showed a 125 micron fiber with a 28 micron diameter hole as the core and a cladding containing 2.8 regional void area percent (CF4/CO/CO2) with an average diameter of 0.67 microns and the smallest diameter holes at 0.17 microns and a maximum diameter of 1.4 microns with a standard deviation of 0.26 microns, and comprising approximately 700 holes.

Example 11

The consolidated blank made in Example 2 was redrawn to 8 mm canes at 1900 C. in a redraw furnace. An overclad of 750 grams of SiO2 (0.56 g/cc density) soot were flame deposited onto a 1 meter long×8 mm diameter pure silica core, airline clad (made via 100 percent nitrogen in Example 17) cane. This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent nitrogen (by volume) atmosphere, then re-down driven through the hot zone at 25 mm/min, then final sintered at 6 mm/min, in order to sinter the soot to a nitrogen/helium-seeded overclad blank. The blank was placed for 24 hours in an argon purged holding oven set at 1000° C. to outgas the helium from the blank.

The blank was drawn to 125 micron diameter fiber in a manner similar to Example 1. Scanning Electron Microscope image analysis of the end face of a fiber showed about 4 micron radius solid silica core region surrounded by an approximately 16 micron outer radius void-containing near clad region containing approximately 11.6 volume percent holes (nitrogen) with a mean hole diameter of 0.70 microns, which is surrounded by a void-containing silica outer cladding having an outer diameter of 125 microns (all radial dimensions measured from the center of the optical fiber) containing 4.7 volume percent holes (nitrogen) with a mean hole diameter of 0.54 microns, the smallest diameter holes at 0.03 microns, a maximum diameter of 0.87 microns with a standard deviation of 0.23 microns. Thus demonstrating that different levels of voids with respect to fiber radius and therefore an index profile of different levels of differing percent voids can be achieved. Optical properties for this fiber were 17.4 dB/Km at 1550 nm when measured as a multimode attenuation.

Example 12

500 grams of SiO2 (0.46 g/cc density) soot were flame deposited onto a 1 meter long×15 mm diameter pure silica core cane. This assembly was then sintered as follows. The assembly was first dried for 2 hours in an atmosphere consisting of helium and 3 percent chlorine at 1000° C. followed by down driving at 32 mm/min through a hot zone set at 1500° C. in a 70 percent nitrogen and 30 percent SiF4 (by volume) atmosphere, then re-down driven through the hot zone at 25 mm/min in the same atmosphere, then final sintered in 100 percent nitrogen at 6 mm/min, in order to sinter the soot to a F-doped+nitrogen-seeded overclad blank. The blank was placed for 24 hours in an argon purged holding oven set at 1000° C.

The blank was drawn to 125 micron diameter fiber in a manner similar to Example 1. Optical image analysis at 200 and 500 fold magnification of the end face of a fiber showed about 82 micron diameter solid silica core and a cladding containing approximately 9.0 volume percent holes (nitrogen) with a mean hole diameter of 0.73 microns diameter the smallest diameter holes at 0.03 microns, a maximum diameter of 2.0 microns with a standard deviation 0.40 microns, and comprising approximately 1200 holes. Optical properties for this fiber were 16.1, 14.5 and 13.2 dB/Km at 850, 1310 and 1550 nm, respectively, when measured as a multimode attenuation. Optical bend performance data showed a 1.85 and 0.67 dB increase in attenuation at 850 and 1550 nm, respectively, when the fiber was wrapped once around a mandrel having a 5 mm radius. The control fiber without voids was made; SiF4+He sintering atmosphere was used in the cladding and resulted in a fiber with no voids. Optical bend performance of this control fiber showed a 8.06 and 9.33 dB increase in attenuation at 850 and 1550 nm, respectively, when the fiber was wrapped once around a mandrel having a 5 mm radius. These results demonstrate the superior bend performance of a fiber containing voids in the cladding.

Example 13

500 grams of SiO2 (0.53 g/cc density) soot were flame deposited onto a 1 meter long×15 mm diameter solid glass cane of GeO2-SiO2 graded index (2 percent delta index (vs. silica) at peak with a parabolic shape). This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent nitrogen atmosphere, then re-down driven through the hot zone at 25 mm/min in the same atmosphere, then final sintered in 100 percent nitrogen at 6 mm/min, in order to sinter the soot to a nitrogen-seeded overclad blank. The blank was placed for 24 hours in an argon purged holding oven set at 1000° C.

The blank was drawn to 125 micron diameter fiber in a manner similar to Example 1. Optical image analysis at 200 and 500 fold magnification of the end face of a fiber showed about 81 micron diameter solid germania doped silica core and a cladding containing approximately 3.5 volume percent holes (nitrogen) with a mean hole diameter of 0.46 microns diameter the smallest diameter holes at 0.04 microns, a maximum diameter of 0.97 microns with a standard deviation of 0.16 microns, and comprising approximately 1500 holes. Optical properties for this fiber were 3.36, 1.09 and 0.84 dB/Km at 850, 1310 and 1550 nm, respectively, when measured as a multimode attenuation. Optical bend performance data showed a less than 0.70 dB and 0.55 dB increase in attenuation at 850 and 1550 nm, respectively, when the fiber was wrapped once around a mandrel having a 5 mm radius. The commercially available 62.5 micron core (GeO2-SiO2 graded index (2 percent delta index (vs. silica) at peak with a parabolic shape), 125 micron diameter control fiber without voids was measured for bend resistance. Optical bend performance of this control fiber showed a 1.13 and 1.20 dB increase in attenuation at 850 and 1550 nm, respectively, when the fiber was wrapped once around a mandrel having a 5 mm radius. These results demonstrate the superior bend performance of a fiber containing voids in the cladding.

Example 14

1200 grams of SiO2 (0.47 g/cc density) soot were flame deposited onto a 1 meter long×15 mm diameter solid glass cane of GeO2-SiO2 graded index (2 percent delta index (vs. silica) at peak with a parabolic shape). This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent oxygen atmosphere, then re-down driven through the hot zone at 25 mm/min in the same atmosphere, then final sintered in 100 percent oxygen at 6 mm/min, in order to sinter the soot to a oxygen-seeded overclad blank. The blank was placed for 24 hours in an argon purged holding oven set at 1000° C.

The blank was drawn to 125 micron diameter fiber in a manner similar to Example 1. Optical image analysis at 200 and 500 fold magnification of the end face of a fiber showed a 62.5 micron diameter solid silica-germania core and a cladding containing approximately 9.0 volume percent holes (oxygen) with a mean hole diameter of 0.45 microns diameter the smallest diameter holes at 0.03 microns, a maximum diameter of 1.2 microns with a standard deviation of 0.21 microns, and comprising approximately 400 holes. Measured attenuation for this fiber was 3.00, 0.74 and 0.45 dB/Km at 850, 1310 and 1550 nm, respectively, when measured as a multimode attenuation. Optical bend performance data showed a less than 0.03 dB and less than 0.01 dB increase in attenuation at 850 and 1550 nm, respectively, when the fiber was wrapped once around a mandrel having a 5 mm radius. The commercially available 62.5 micron core (GeO2-SiO2 graded index (2 percent delta index (vs. silica) at peak with a parabolic shape), 125 micron diameter control fiber without voids was measured for bend resistance. Optical bend performance of this control fiber showed a 1.13 and 1.20 dB increase in attenuation at 850 and 1550 nm, respectively, when the fiber was wrapped once around a mandrel having a 5 mm radius. These results demonstrate the superior bend performance of a fiber containing voids in the cladding. Bandwidth measurements (overfill launch) were at 850 nm=200 MHz*km and at 1300 nm=500 MHz*km. This example illustrates a microstructured optical fiber which is multimoded at 1550 nm. The fiber exhibits a core region having a first refractive index and a cladding region having a second refractive index which is lower than that of the core region such that the light which is to be transmitted through the fiber is retained generally within the core, wherein the cladding comprises at least one region in the cladding which is comprised of a plurality of non-periodically located voids. Such fibers preferably are multimoded at 1550 nm and exhibit an increase in attenuation at 1550 nm, when said fiber is wrapped once around a mandrel having a radius of 5 mm, which is less than 1 dB/km, more preferably less than 0.75, and most preferably less than .05 db/km.

Example 15

The optical fiber preform described in example 8 was drawn to 125 micron diameter fiber at 3 meters/second in a furnace having an 8" long hot zone set at 2000° C. SEM analysis of the end face of a fiber showed about a 4 micron radius solid silica core surrounded by an approximately 18 micron radius airline-containing near clad region containing 8.5 regional void area percent (nitrogen filled) with a mean hole diameter of 0.63 microns diameter the smallest diameter holes at 0.03 microns, a maximum diameter of 1.9 microns, and a standard deviation of 0.32 microns, which is surrounded by a void-free pure silica outer cladding having an outer diameter of 125 microns (all radial dimensions measured from the center of the optical fiber). The fiber drawn in Example 8 has only 2.9 regional void area percent (nitrogen) with an average diameter of 0.45 microns; thus demonstrating that draw conditions (in this case a longer hot zone and faster draw speed) can be used to control the hole air-fill fraction and hole diameter. The overclad portion located outside of the airline containing cladding region was void free consolidated glass containing no holes.

Example 16

3000 grams of SiO2 (0.53 g/cc density) soot were flame deposited onto a 1 meter long×8 mm diameter pure silica core cane. This assembly was then sintered as follows. The assembly was first dried for 2 hours in an atmosphere consisting of helium and 3 percent chlorine at 1000° C. followed by down driving at 32 mm/min through a hot zone set at 1500° C. in a 100% argon (by volume) atmosphere, then re-down driven through the hot zone at 25mm/min, then final sintered in argon at 6 mm/min, in order to sinter the soot to an argon-seeded overclad blank. The blank was placed for 24 hours in an argon purged holding oven set at 1000° C. to outgas the helium from the blank. The blank was drawn to 125 micron diameter fiber in a manner similar to Example 1. SEM analysis of the end face of a fiber showed about 22 micron diameter solid silica core and a cladding containing approximately 8.0 regional void area percent (argon) with a mean hole diameter of 0.35 microns diameter the smallest diameter holes at 0.03 microns, a maximum diameter of 0.85 microns, and a standard deviation of 0.15 microns. Optical properties for this fiber were 1.65 and 1.20dB/Km at 1310 and 1550 nm, respectively, when measured as a multimode attenuation.

Example 17

3000 grams of SiO2 (0.55 g/cc density) soot were flame deposited onto a 1 meter long×8 mm diameter pure silica core cane. This assembly was then sintered as follows. The assembly was first dried for 2 hours in an atmosphere consisting of helium and 3 percent chlorine at 1000° C. followed by down driving at 32 mm/min through a hot zone set at 1500° C. in a 100% nitrogen (by volume) atmosphere, then re-down driven through the hot zone at 25mm/min, then final sintered at 6 mm/min, in order to sinter the soot to an nitrogen-seeded overclad blank. The blank was placed for 24 hours in an argon purged holding oven set at 1000° C. to outgas the helium from the blank. The blank was drawn to 125 micron diameter fiber in a manner similar to Example 1. SEM analysis of the end face of a fiber showed about 22 micron diameter solid silica core and a cladding containing 2.0 regional void area percent (nitrogen) with an average diameter of 0.22 microns, the smallest diameter holes at 0.03 microns and the largest diameter of 0.50 microns, and a standard deviation of 0.08 microns. Optical properties for this fiber were 1.28 and 0.87 dB/Km at 1310 and 1550 nm, respectively, when measured as a multimode attenuation and 0.28 dB/Km at 1550 nm when spliced to a single moded fiber and measuring the fundamental mode for this fiber.

Example 18

4600 grams of SiO2 (0.42 g/cc density) soot were flame deposited onto a 1 meter long×10 mm diameter step index (0.35 percent delta, 0.33 core/clad diameter ratio) GeO2-SiO2core-SiO2 clad cane similar to the process used to make a cane from Step 1. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100% oxygen (by volume) atmosphere in order to sinter the soot to an oxygen-seeded overclad blank. The blank was placed for 24 hours in an argon purged holding oven set at 1000° C. to outgas the helium from the blank.

The optical fiber preform was drawn to 125 micron diameter fiber at 18 meters/second in a furnace having an 8" long hot zone set at 2000° C. The blank was drawn to 125 micron diameter fiber in a maimer similar to Example 15. SEM analysis of the end face of the fiber showed an approximately 4 micron radius $GeO_2$-$SiO_2$ center core region surrounded by an approximately 12 micron outer radius void-free near clad region surrounded by an approximately 18 micron outer radius void containing cladding region which is surrounded by a void-free pure silica outer cladding having an outer diameter of 125 microns (all radial dimensions measured from the center of the optical fiber). The void containing ring region comprised 4.2 percent regional area percent holes (100 percent $O_2$ by volume) in that area with an average diameter of 0.53 microns and the smallest diameter holes at 0.18 microns and a maximum diameter of 1.4 microns, resulting in about 85 total number of holes in the fiber cross-section. Because of the relatively slow downdrive and sinter rate, the holes were located adjacent to the region corresponding to where the $GeO_2$-$SiO_2$ core-$SiO_2$ clad core cane was during consolidation and extending out from a radial distance from the fiber centerline of 12 microns to about 18 microns radial distance across the fiber cross-section. The total fiber void area percent (area of the holes divided by total area of the optical fiber cross-section×100) was about 0.21 percent. Optical properties for this fiber were 0.34 and 0.21 dB/Km at 1310 and 1550 nm, respectively, and a fiber cutoff showing the fiber was single moded above 1230 nm, thereby making the fiber single moded at wavelengths above 1230 nm. A portion of this fiber was measured for bend performance around a 10 mm diameter mandrel, and the fiber exhibited an increase in attenuation at 1550 nm of about 0.7 dB/turn, thus demonstrating that attenuation increases of even less than 5 dB/turn around a 10 mm diameter mandrel are achievable using the methods disclosed herein. This same portion of the fiber was measured for bend performance around a 20 mm diameter mandrel, and the fiber exhibited an increase in attenuation at 1550 nm of about 0.08 dB/turn, thus demonstrating that attenuation increases of less than 1 dB/turn, and more preferably less than 0.5 dB/turn around a 20 mm diameter mandrel are achievable using the methods disclosed herein.

Example 19

290 grams of SiO2 (0.47 g/cc density) soot were deposited via OVD onto a fully consolidated 1 meter long×10.4 mm diameter step index (0.35 percent delta, 0.33 core/clad diameter ratio) GeO2-SiO2 core-SiO2 clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent oxygen sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a oxygen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 3600 grams of additional SiO2 (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to an Germania containing void-free core, silica void-free inner cladding, silica oxygen-seeded ring (i.e., silica with holes containing oxygen), and void-free overclad blank. The blank was placed for 24 hours in an argon purged holding oven set at 1000° C. to outgas the helium from the blank. The optical fiber preform was drawn to about 125 micron diameter fiber at 20 meters/second in a furnace having an 8" long hot zone set at 2000° C. SEM analysis of the end face of a fiber showed an approximately 4 micron radius GeO2-SiO2 core surrounded by a 12 micron outer radius void-free near clad region surrounded by 18 micron outer radius void containing cladding region (ring thickness of approximately 6 microns) which is surrounded by a void-free pure silica outer cladding having an outer diameter of about 125 microns (all radial dimensions measured from the center of the optical fiber). The void containing ring region comprised 2.7 percent regional area percent holes (100 percent O2 by volume) in that area with an average diameter of 0.36 microns and the smallest diameter holes at 0.05 microns and a maximum diameter of 0.8 microns, resulting in about 105 total number of holes in the fiber cross-section. The total fiber void area percent (area of the holes divided by total area of the optical fiber cross-section×100) was about 0.1 percent. Optical properties for this fiber were 0.33 and 0.19 dB/Km at 1310 and 1550 nm, respectively, and a fiber cutoff of about 1250 nm, thereby making the fiber single moded at wavelengths above 1250 nm. A portion of this fiber was measured for bend performance around a 10 mm diameter mandrel, and the fiber exhibited an increase in attenuation at 1550 nm of about 0.2 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.02 dB/turn, thus demonstrating that attenuation increases of less than 1 dB/turn, and more preferably less than 0.1 dB/turn, and still more preferably less than 0.05 dB/turn, around a 20 mm diameter mandrel are achievable. This same portion of the fiber was measured for bend performance around a 6 mm diameter mandrel, and the fiber exhibited an increase in attenuation at 1550 nm of about 2 dB/turn, thus demonstrating that attenuation increases of less than 10 dB/turn, and more preferably less than 5 dB/turn, and still more preferably less than 3 dB/turn, around a 6 mm diameter mandrel are achievable.

Example 20

450 grams of SiO2 (0.37 g/cc density) soot were deposited via OVD onto a fully consolidated 1 meter long×22 mm diameter step index (0.35 percent delta, 0.33 core/clad diameter ratio) GeO2-SiO2 core-SiO2 clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent nitrogen sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a nitrogen-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. The blank was then redrawn at 1900° C. in a redraw furnace into 13 mm diameter canes. A 1 meter long 13 mm diameter cane from the previous step was then placed back in a lathe where 4700 grams of additional SiO2 (0.37 g/cc density) soot were deposited via OVD. The soot of this cladding (which maybe called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to an Germania containing void-free core, silica void-free inner cladding, silica nitrogen-seeded ring (i.e., silica with holes containing nitrogen), and void-free overclad blank. The blank was placed for 24 hours in an argon purged holding oven set at 1000° C. to outgas the helium from the blank. The optical fiber preform was drawn to about 125 micron diameter fiber at 10 meters/second in a furnace having an 8" long hot zone set at 2000 ° C. Optical microscope imaging of the end face of a fiber showed an approximately 4 micron radius GeO2-SiO2 core surrounded by a 12 micron outer radius void-free near clad region surrounded by 15 micron outer radius void containing cladding region (ring thickness of approximately 3 microns) which is surrounded by a void-free pure silica outer cladding having an outer diameter of about 125 microns (all radial dimensions measured from the center of the optical fiber). The void containing ring region comprised approximately 3 percent regional area percent holes (100 percent N2 by volume) in that area with an average diameter of approximately 0.2 microns. The total fiber void area percent (area of the holes divided by total area of the optical fiber cross-section×100) was about 0.1 percent. Optical properties for this fiber were 0.34 and 0.196 dB/Km at 1310 and 1550 nm, respectively, and a fiber cutoff of about 1290 nm, thereby making the fiber single moded at wavelengths above 1290 nm. A portion of this fiber was measured for bend performance around a 10 mm diameter mandrel, and the fiber exhibited an increase in attenuation at 1550 nm of about 0.11 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.016 dB/turn, thus demonstrating that attenuation increases of less than 1 dB/turn, and more preferably less than 0.1 dB/turn, and still more preferably less than 0.05 dB/turn, around a 20 mm diameter mandrel are achievable.

Example 21

130 grams of SiO2 (0.37 g/cc density) soot were deposited via OVD onto a fully consolidated 1 meter long×10.5 mm diameter step index (0.35 percent delta, 0.33 core/clad diameter ratio) GeO2-SiO2 core-SiO2 clad core cane, thereby resulting in a preform comprising a consolidated core region which was surrounded by a consolidated silica cladding region which in turn was surrounded by a soot silica region. The soot cladding of this assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent argon sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a forth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a argon-seeded overclad blank. The first series of higher downfeed rate were employed to glaze the outside of the optical fiber preform, which facilitates trapping of the gases in the preform. The blank was then placed for 24 hours in an argon purged holding oven set at 1000° C. This preform was then placed back in a lathe where 5000 grams of additional SiO2 (0.44 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1000° C. followed by down driving at 6 mm/min through a hot zone set at 1500° C. in a 100% helium (by volume) atmosphere in order to sinter the soot to an Germania containing void-free core, silica void-free inner cladding, silica argon-seeded ring (i.e., silica with holes containing argon), and void-free overclad blank. The blank was placed for 24 hours in an argon purged holding oven set at 1000° C. to outgas the helium from the blank. The optical fiber preform was drawn to about 125 micron diameter fiber at 20 meters/second in a furnace having an 8" long hot zone set at 2000° C. Optical microscope imaging of the end face of a fiber showed an approximately 4 micron radius GeO2-SiO2 core surrounded by a 12 micron outer radius void-free near clad region surrounded by 16 micron outer radius void containing cladding region (ring thickness of approximately 4 microns) which is surrounded by a void-free pure silica outer cladding having an outer diameter of about 125 microns (all radial dimensions measured from the center of the optical fiber). The void containing ring region comprised of argon having in that area with an average diameter of approximately 0.3 microns. Optical properties for this fiber were 0.37 and 0.226 dB/Km at 1310 and 1550 nm, respectively, and a fiber cutoff of about 1270 nm, thereby making the fiber single moded at wavelengths above 1270 nm. A portion of this fiber was measured for bend performance around a 10 mm diameter mandrel, and the fiber exhibited an increase in attenuation at 1550 nm of about 0.27 dB/turn, thus demonstrating attenuation increases of even less than 1 dB/turn, preferably less than 0.5 dB/turn, around a 10 mm diameter mandrel. This same portion of the fiber was measured for bend performance around a 20 mm diameter mandrel, and the fiber exhibited an increase in attenuation at 1550 nm of about 0.026 dB/turn, thus demonstrating that attenuation increases of less than 1 dB/turn, and more preferably less than 0.1 dB/turn, and still more preferably less than 0.05 dB/turn, around a 20 mm diameter mandrel are achievable.

Comparative Example

A blank was made similar to Example 1 but sintered in helium only. The assembly was first dried for 2 hours in an atmosphere of helium and 3 percent chlorine at 1000° C., followed by down driving the assembly at 32 mm/min through a hot zone set at 1500° C. in an atmosphere consisting of 100 percent helium. The assembly was then re-down driven through the same hot zone and atmosphere at 25 mm/min, after which the assembly was again driven through the same hot zone and atmosphere for final sintering at 6 mm/min). As was expected, the clad glass was found to contain no seeds. The blank was placed for 24 hours in an argon purged holding oven set at 1000° C. to outgas the helium. When the blank was drawn to 125 micron fiber in a manner similar to Example 1, it was found to contain no holes (this was expected). A 2.4 Km length of fiber did not transmit light as measured by the cutback method (indicating that the attenuation was greater than 100 dB/Km); this was expected since there was no refractive index contrast between the core and the clad.

Comparative Example

A blank was made similar to Example 1 but sintered in helium only. The assembly was first dried for 2 hours in an atmosphere of helium and 3 percent chlorine at 1000° C., followed by down driving the assembly at 32 mm/min through a hot zone set at 1500° C. in an atmosphere consisting of 100 percent helium. The assembly was then re-down driven through the same hot zone and atmosphere at 25 mm/min, after which the assembly was again driven through the same hot zone and atmosphere for final sintering at 6 mm/min). As was expected, the clad glass was found to contain no seeds. The blank was placed for 24 hours in an argon purged holding oven set at 1000° C. to outgas the helium. When the blank was drawn to 125 micron fiber in a manner similar to Example 1, it was found to contain no holes (this was expected). A 2.4 Km length of fiber did not transmit light as measured by the cutback method (indicating that the attenuation was greater than 100 dB/Km); this was expected since there was no refractive index contrast between the core and the clad.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making an optical fiber comprising forming via a CVD operation a soot containing optical fiber preform;
consolidating the soot in said soot containing preform in a gaseous atmosphere under conditions which are effective to trap a portion of said gaseous atmosphere in said preform during said consolidation step, thereby forming a consolidated preform having voids in said preform, and
using said preform in a manufacturing process to make an optical fiber having a core region having a first refractive index and a cladding region having a second refractive index lower than that of the core, said cladding comprising a region of non-periodically located voids surrounding said core having a total fiber void area percent, when the fiber is viewed in cross-section, that is greater than 0.05 percent, wherein said consolidating step comprises first exposing said preform to a temperature greater than about 1500 C and a feed rate into a consolidation furnace sufficient to result in at least a portion of said preform increasing in temperature at a rate greater than about 12 C/min.

2. The method of claim 1, wherein said consolidating step comprises consolidating said soot containing perform in a furnace a temperature greater than 1500 C and heating said preform at at least a first temperature ramp rate greater than 10 C/minute, and said gaseous atmosphere comprises at least one gas selected from the group consisting of nitrogen, argon, $CO_2$, oxygen, chlorine, CF4, CO, SO2 and mixtures thereof, and wherein said using said preform in a manufacturing process step comprises drawing an optical fiber from said perform such that said voids formed in consolidating step are retained in said fiber.

3. The method of claim 2, wherein said soot preform comprises a tubular preform, and said consolidated preform comprises a tubular preform.

4. The method of claim 1, wherein said soot containing preform in said consolidating step comprises at least a void free core region onto which additional soot has been deposited via said CVD operation, and said consolidating step results in said preform having voids in the cladding region of said consolidated preform.

5. The method of claim 1, wherein the maximum cross sectional diameter of each of said voids is less than 1550 nm.

6. The method of claim 1, wherein said forming step comprises depositing soot via CVD onto the outside of a glass core rod and said consolidating step takes place after said forming step.

7. The method of claim 1, wherein said using said perform step further comprises drawing said consolidated preform into an optical fiber, wherein said voids which were formed during said consolidation step are retained and deformed during said drawing step and remain in the fiber after said drawing step.

8. The method of claim 1, wherein said gaseous atmosphere comprises at least one gas selected from the group consisting of argon, nitrogen, carbon monoxide, carbon dioxide, oxygen, CF4, C2F6, Kr, and mixtures thereof.

9. A method of making an optical fiber comprising forming via a CVD operation a soot containing optical fiber preform;
consolidating the soot preform in a gaseous atmosphere which comprises at least one gas selected from the group consisting of nitrogen, argon, $CO_2$, oxygen, chlorine, CF4, CO, SO2 and mixtures thereof under conditions which are effective to trap a portion of said gaseous atmosphere in said preform during said consolidation step, thereby resulting in the formation of voids in said consolidated preform, and
using said consolidated preform in a manufacturing process to form an optical fiber having a core region having a first refractive index and a cladding region having a second refractive index lower than that of the core such that light which is transmitted through the fiber is retained generally within the core, whereby said voids are located at least substantially in the cladding of said optical fiber, wherein said voids have a total fiber void area percent, when the fiber if viewed in cross-section, that is greater than 0.05 percent, and wherein said consolidating step comprises first exposing said preform to a temperature greater than about 1500 C and a feed rate into a consolidation furnace sufficient to result in at least a portion of said preform increasing in temperature at a rate greater than about 12 C/min.

10. The method of claim 9, wherein said consolidating step comprises first exposing said preform to a temperature and feed rate into a consolidation furnace sufficient to result in said preform increasing in temperature at a rate greater than about 14° C./min.

11. The method of claim 10, wherein said consolidating step comprises exposing the preform in a furnace which is maintained at a temperature of equal to or greater than 1390° C.

12. The method of claim 9, wherein said consolidating step further comprises, subsequent to said first exposing step, exposing said preform to a temperature and feed rate into a consolidation furnace sufficient to result in said preform increasing in temperature at a rate which is at least 2° C./min less than in said first exposing step.

13. The method of claim 12, wherein said atmosphere comprises at least one gas selected from the group consisting of nitrogen, argon and combinations thereof in an amount greater than 85 percent by volume, the remainder of said atmosphere at least substantially made up of helium.

14. The method of claim 9, wherein said atmosphere comprises nitrogen or argon in an amount greater than 65 percent by volume.

15. The method of claim 9, said method further comprising either (1) forming said soot containing preform by depositing said soot onto a core cane doped with germanium or (2) inserting a germanium doped core cane into a void containing cladding region formed via said consolidating step.

16. The method of claim 9, wherein said region containing non-periodically distributed holes is not immediately adjacent to the core.

* * * * *

UNITED STATES PATENT AND TRADEMARK OFFICE
CERTIFICATE OF CORRECTION

| | | |
|---|---|---|
| PATENT NO. | : 7,930,904 B2 | Page 1 of 1 |
| APPLICATION NO. | : 12/244359 | |
| DATED | : April 26, 2011 | |
| INVENTOR(S) | : Dana Craig Bookbinder et al. | |

It is certified that error appears in the above-identified patent and that said Letters Patent is hereby corrected as shown below:

On the title page item [54] and column 1, line 1 should read, METHOD OF MAKING AN OPTICAL FIBER Signed and Sealed this
Fifth Day of March, 2013

Teresa Stanek Rea
*Acting Director of the United States Patent and Trademark Office*